(12) United States Patent
Tang et al.

(10) Patent No.: US 12,196,601 B2
(45) Date of Patent: Jan. 14, 2025

(54) TAMPER-DETECTION DEVICE TO DETECT UNAUTHORIZED OPERATIONS ON APPARATUS

(71) Applicant: AMBIT MICROSYSTEMS (SHANGHAI) LTD., Shanghai (CN)

(72) Inventors: Xiao-Hu Tang, Shenzhen (CN); Pei Liu, Shanghai (CN)

(73) Assignee: AMBIT MICROSYSTEMS (SHANGHAI) LTD., Shanghai (CN)

( * ) Notice: Subject to any disclaimer, the term of this patent is extended or adjusted under 35 U.S.C. 154(b) by 267 days.

(21) Appl. No.: 17/977,036

(22) Filed: Oct. 31, 2022

(65) Prior Publication Data

US 2023/0417595 A1 Dec. 28, 2023

(30) Foreign Application Priority Data

Jun. 24, 2022 (CN) .......................... 202210728998.1

(51) Int. Cl.
*G01H 17/00* (2006.01)
(52) U.S. Cl.
CPC ................................... *G01H 17/00* (2013.01)
(58) Field of Classification Search
None
See application file for complete search history.

(56) References Cited

U.S. PATENT DOCUMENTS

| 2015/0204760 A1* | 7/2015 | Bottcher | ............... G01H 1/003 73/112.01 |
| 2019/0325668 A1* | 10/2019 | Cole | .................... G05D 1/0692 |
| 2020/0103894 A1* | 4/2020 | Cella | .................. G05B 23/0289 |

FOREIGN PATENT DOCUMENTS

| CN | 105191891 A | 12/2015 |
| CN | 114110026 A | 3/2022 |
| CN | 114172062 A | 3/2022 |
| CN | 111079205 B | 6/2022 |

* cited by examiner

*Primary Examiner* — Raul J Rios Russo
*Assistant Examiner* — Carl F. R. Tchatchouang
(74) *Attorney, Agent, or Firm* — ScienBiziP, P.C.

(57) ABSTRACT

A device to detect unauthorized opening of a casing is disposed in the upper or lower casing of an apparatus. The device includes a base plate with vibrator, carrier, and sensor on the lower case, and receiving grooves. Balls of a lesser number than the number of receiving grooves are installed in the grooves in a predetermined arrangement by the manufacturer. A waveguide element and magnet, fixed on the upper casing, is in contact with the balls, and when the waveguide is vibrated, the number and locations of the balls govern the form of a setting signal derived therefrom at the factory. If the upper casing is separated from the lower casing, the waveguide element separates from the carrier, the magnetic element gathers the balls, the predetermined arrangement being thereby lost, when tested by an authorized repair engineer.

10 Claims, 5 Drawing Sheets

TAMPER-DETECTION DEVICE TO DETECT UNAUTHORIZED OPERATIONS ON APPARATUS

FIELD

The subject matter herein generally relates to a disassembling detection device, in particular a disassembling detection device that detects whether the casing of an electronic apparatus has been opened.

BACKGROUND

An electronic apparatus purchased by a customer generally has a warranty. During the warranty period, if the electronic apparatus fails, the customer can go to the manufacturer's maintenance unit for maintenance, repair, or replacement without any cost or for a small cost. However, sometime the customer disassembled the electronic apparatus for modification and the damages were caused by the customer.

Therefore, in order to record the history and an integrity of the apparatus, the conventional art is to stick a label on the screw hole on the casing of the electronic apparatus. However, the label can be fragile and break or become detached even under normal use of the electronic apparatus, resulting in erroneous decisions if the electronic apparatus has been tempered with.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
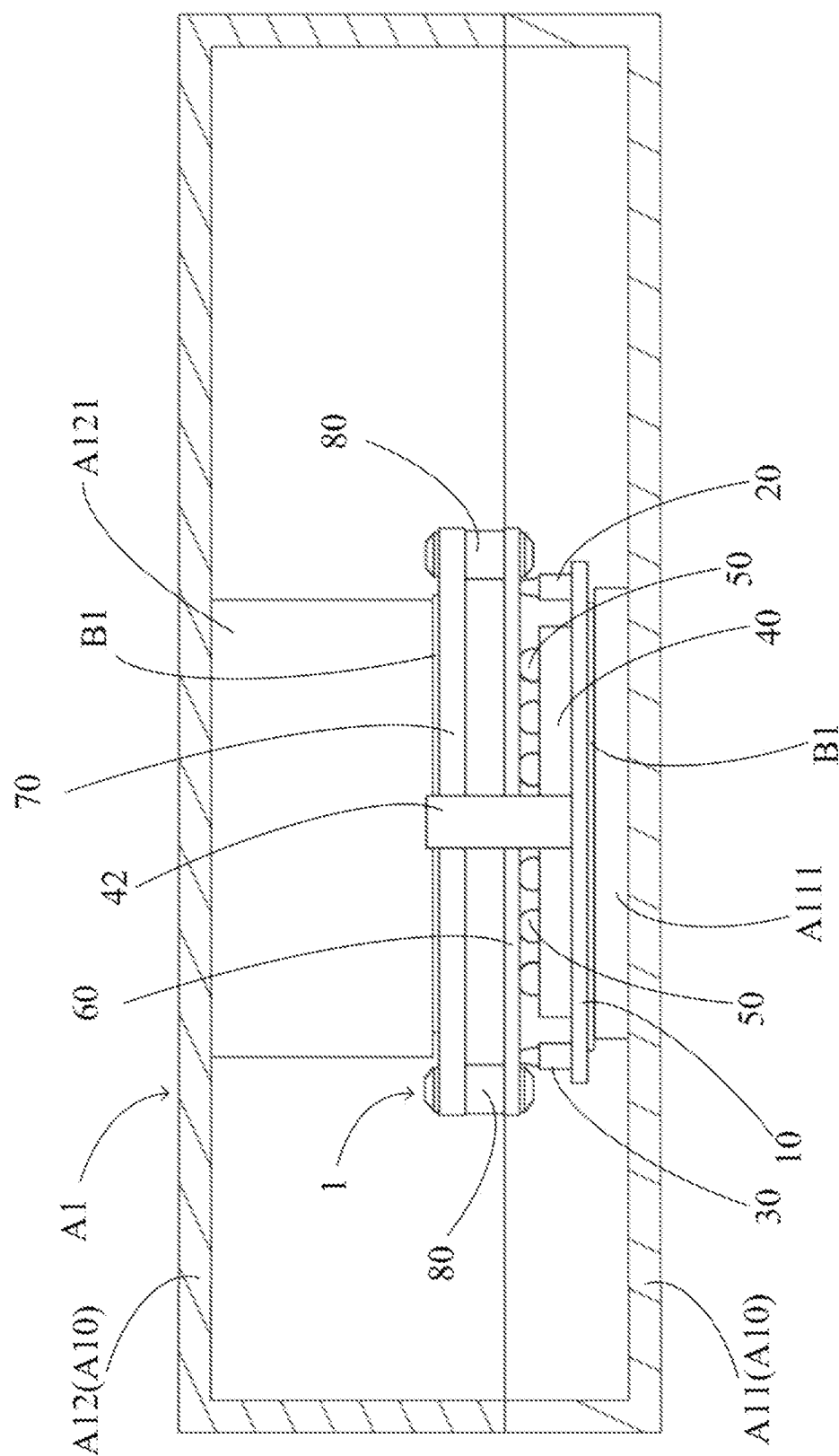
FIG. 1 is a schematic diagram of an electronic apparatus with a tamper-detection device in accordance with an embodiment of the present disclosure, an upper casing covers a lower casing of the electronic apparatus.
Figure 2:
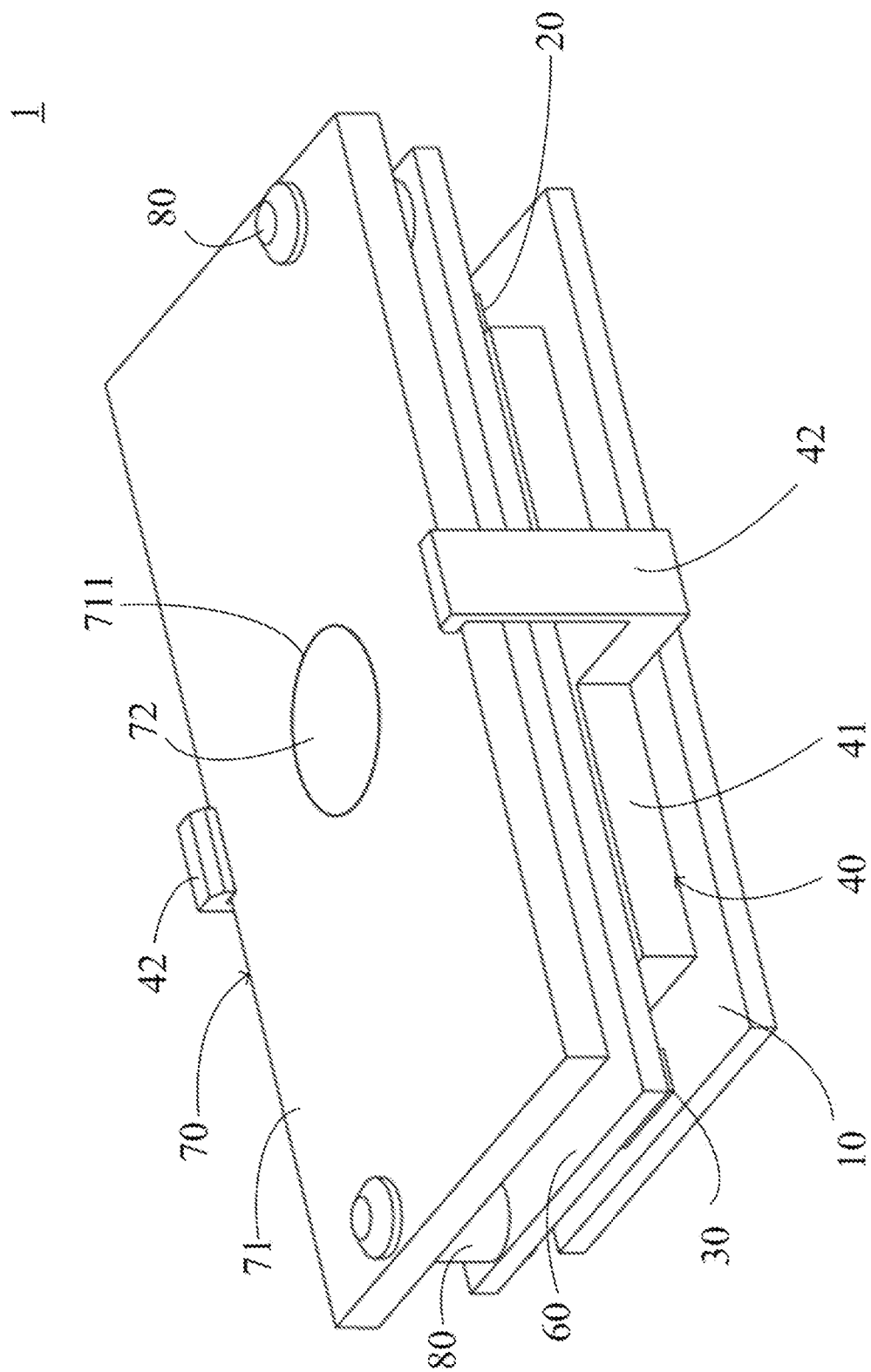
FIG. 2 is a perspective view of the device of FIG. 1.
Figure 3:
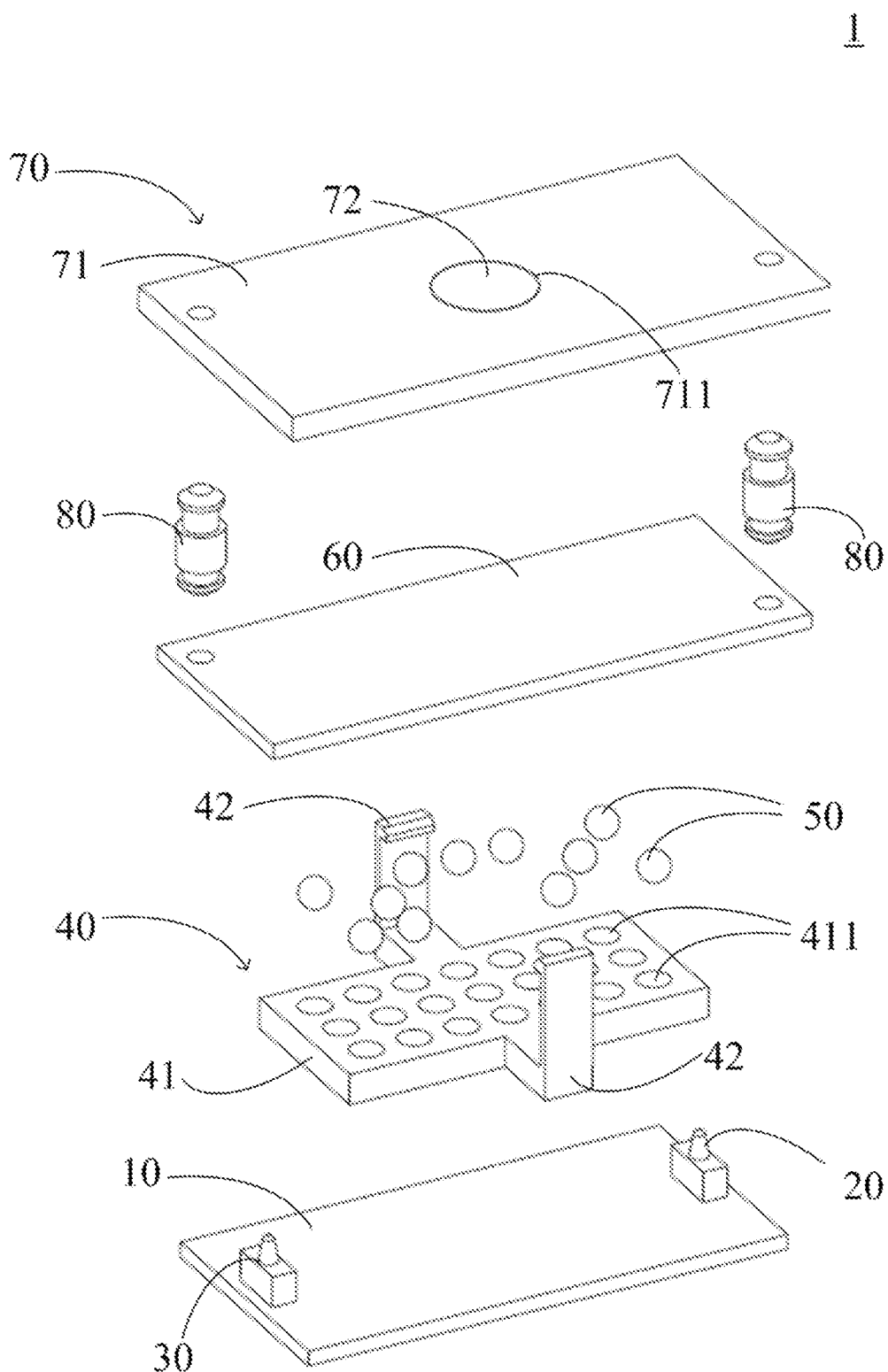
FIG. 3 is an exploded view of the tamper-detection device of FIG. 1.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of embodiments and not by way of limitation in the figures of the accompanying drawings, in which like references indicate similar elements. It should be noted that references to "an" or "one" embodiment in this disclosure are not necessarily to the same embodiment, and such references mean "at least one."

The term "connect" is defined as directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

The present invention uses a tamper-detection device to detect unauthorized opening of a casing of an electronic apparatus, so as to determine responsibility for any damage or malfunction of the electronic apparatus. The device makes it very difficult for the user to prevent discovery of the casing having been opened.

FIG. 1 is a schematic diagram of an electronic apparatus A1 with a tamper-detection device 1 in accordance with an embodiment of the present disclosure. The electronic apparatus A1 may be a personal computer, a laptop computer, a tablet computer, a server, or a router, but it is not limited thereto. The casing A10 of the electronic apparatus A1 includes a lower casing A11 and an upper casing A12. The upper casing A12 covers the lower casing A11. The disassembling detection device 1 is disposed in the casing A10, and affixed to the lower casing A11 and the upper casing A12. The tamper-detection device 1 can be disassembled to reveal whether the casing A10 has ever been opened.

The disassembling detection device 1 includes a base plate 10, a vibrator a sensor 30, a carrier 40, balls 50, a waveguide element 60, a magnetic element 70, and two connecting elements 80. The base plate 10, the carrier 40, the waveguide element 60, and the magnetic element 70 are sequentially stacked. The base plate 10 is affixed in the lower casing A11. In the embodiment, the base plate 10 is affixed to the lower casing A11 by glue B1.

The vibrator 20 is disposed on the base plate 10, and used to vibrate the waveguide element 60. The sensor 30 is disposed on the base plate 10, and used to detect vibration of the waveguide element 60. The vibrator 20 and the sensor 30 are disposed on opposite edges of the base plate 10. In the embodiment, the vibrator 20 may be a linear motor, and the sensor 30 may be a vibration sensor 30, and the base plate 10 may be a circuit board. The vibrator 20 and the sensor 30 are electrically connected to the circuit board. Moreover, the top of the vibrator 20 and the top of the sensor 30 are in contact with the waveguide element 60.

The carrier 40 is disposed on the base plate 10, and is between the vibrator and the sensor 30. The carrier 40 includes a carrying body 41 and two buckle structures 42. The carrying body 41 may be a plate structure parallel to the base plate 10. In the embodiment, the carrying body 41 is affixed to the base plate 10. In some embodiments, the carrying body 41 is fastened to the base plate 10 or adhered to base plate 10. The carrying body 41 includes receiving grooves 411. The receiving grooves 411 are arranged in an array. The buckle structures 42 are connected to opposite sides of the carrying body 41, and extend perpendicular to the carrying body 41. In the embodiment, the buckle structures 42 fasten to the magnetic element 70.

Each ball 50 is arranged in one of the receiving grooves 411, but simply rest in the receiving grooves 411 and are not affixed. One receiving groove 411 receives one ball 50. In the embodiment, the receiving grooves 411 have curved surfaces corresponding to the balls 50. The balls 50 protrude out of the receiving grooves 411 and the carrying body 41. In one embodiment, the height (that is, diameter) of the balls 50 is greater than twice the depth of the receiving grooves 411. The number of balls 50 is less than the number of receiving grooves 411. In other words, some receiving grooves 411 are empty and have no ball 50. Since the number of balls 50 is less than the number of receiving grooves 411, the balls 50 can be arranged in various ways in the receiving grooves 411.

In one embodiment, the number of balls 50 is less than the number of the receiving grooves 411 by a number between 1 and 20. In one embodiment, the number of balls 50 used is in the range of 0.1 times to 0.9 times, or 0.4 times to 0.7 times the number of the receiving grooves 411. In one embodiment, the number of used balls 50 can be up to 50. The number of receiving grooves 411 can be up to 51.

The waveguide element 60 is in contact with the balls 50, the vibrator 20, and the sensor 30. In the embodiment, the waveguide element 60 may be a plate structure parallel to the carrying body 41 and/or the base plate 10. The magnetic element 70 is disposed on the waveguide element 60, and is affixed in the upper casing A12. The magnetic element 70 is parallel to the waveguide element 60 and/or base plate 10. The magnetic element 70 may be a plate structure, and adhered to the upper casing A12 by the glue B1. In the embodiment, the lower casing A11 includes a lower mounting protrusion A111, and the upper casing A12 includes an upper mounting protrusion A121. The base plate 10 is adhered to the lower mounting protrusion A111 by the glue B1, and the magnetic element 70 is adhered to the upper mounting protrusion A121 by the glue B1. The sizes of the lower mounting protrusion A111 and the upper mounting protrusion A121 can be adjusted for fitting into casings A10 of different sizes.

In the embodiment, the lower mounting protrusion A111 is directly or indirectly connected to the bottom plate of the lower casing A11, and the upper mounting protrusion A121 is directly or indirectly connected to the top plate of the upper casing A12. In some embodiments, the lower mounting protrusion A111 is directly or indirectly connected to the side wall of the lower casing A11. Moreover, the upper mounting protrusion A121 is directly or indirectly connected to the side wall of the upper casing A12.

In the embodiment, the magnetic element 70 includes a fixed plate 71 and a magnet 72. The fixed plate 71 has an opening 711. The magnet 72 is disposed in the opening 711, the magnet 72 may be a plate structure. The opening 711 is at the center area of the fixed plate 71, and the magnet 72 corresponds to the center area of the carrier 40.

The connecting element 80 is connected to the magnetic element 70 and the waveguide element 60, and separates the waveguide element 60 from the magnetic element 70. The connecting element 80 may be an elastic material, used to reduce the vibration transmitted to the magnetic element 70. In other words, the waveguide element 60 is affixed to the magnetic element 70 by the connecting element 80.

Figure 4:
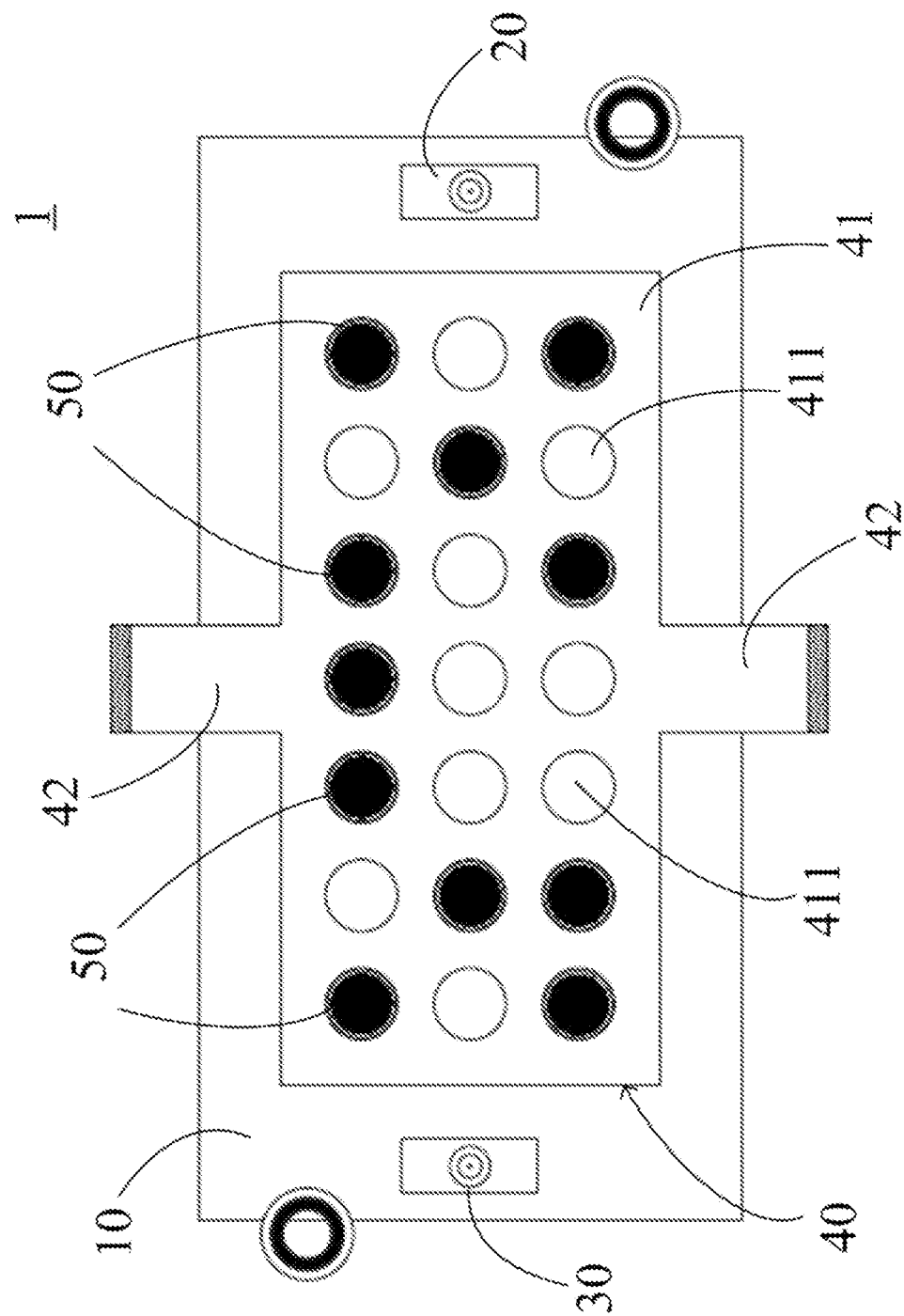
FIG. 4 is a schematic view showing balls arranged in receiving grooves of a carrier according to a predetermined arrangement.

FIG. 4 is a schematic view showing the balls 50 arranged in the receiving grooves 411 on the carrier 40 according to a predetermined arrangement. The arrangement of the balls 50 in FIG. 4 is only an example, the balls 50 can be installed in any arrangement, as the predetermined arrangement, according to requirements. As shown in FIG. 1 and FIG. 4, the tamper-detection device 1 is installed in the electronic apparatus A1. The upper casing A12 covers the lower casing A11, and the tamper-detection device 1 is affixed in the upper casing A12 and the lower casing A11. Moreover, the balls are arranged in the receiving grooves 411 of carrier 40 in the predetermined arrangement.

Before the electronic apparatus A1 is actually delivered to the customer, the electronic apparatus A1 can perform an initial setting. The electronic apparatus A1 can transmit a vibration signal to the vibrator 20. The vibrator 20 vibrates the waveguide element 60 according to the vibration signal. At this time, the vibration of the waveguide element 60 is affected by the presence of the balls 50 in their particular arrangement to change the waveform. The sensor 30 detects the vibration of the waveguide element 60, and forms a setting signal according to the vibration of the waveguide element 60. The electronic apparatus A1 records and stores the setting signal.

When the electronic apparatus A1 is delivered for repair, the manufacturer or agent engineer can verify whether the casing A10 of the electronic apparatus A1 has ever been opened by the user. During verification, the engineer can drive the electronic apparatus A1 to transmit a vibration signal to the vibrator 20. The waveform of the sensor 30 detects the vibration of the waveguide element 60 to form a test signal. If the test signal detected by the sensor 30 is the same as the setting signal originally stored in the electronic apparatus A1, the engineer can decide that the casing A10 of the electronic apparatus A1 has not been opened by the user.

In another embodiment, the electronic apparatus A1 has a product code. The original setting signal corresponds to the product code, and such original setting signal can be stored in an external electronic apparatus. When the electronic apparatus A1 is verified, the original setting signal stored by the external electronic apparatus can be found according to the product code. If the test signal detected by the sensor 30 is the same as the original setting signal stored in the external electronic apparatus, the engineer can decide that the casing A10 of the electronic apparatus A1 has not been opened by the user.

Figure 5:
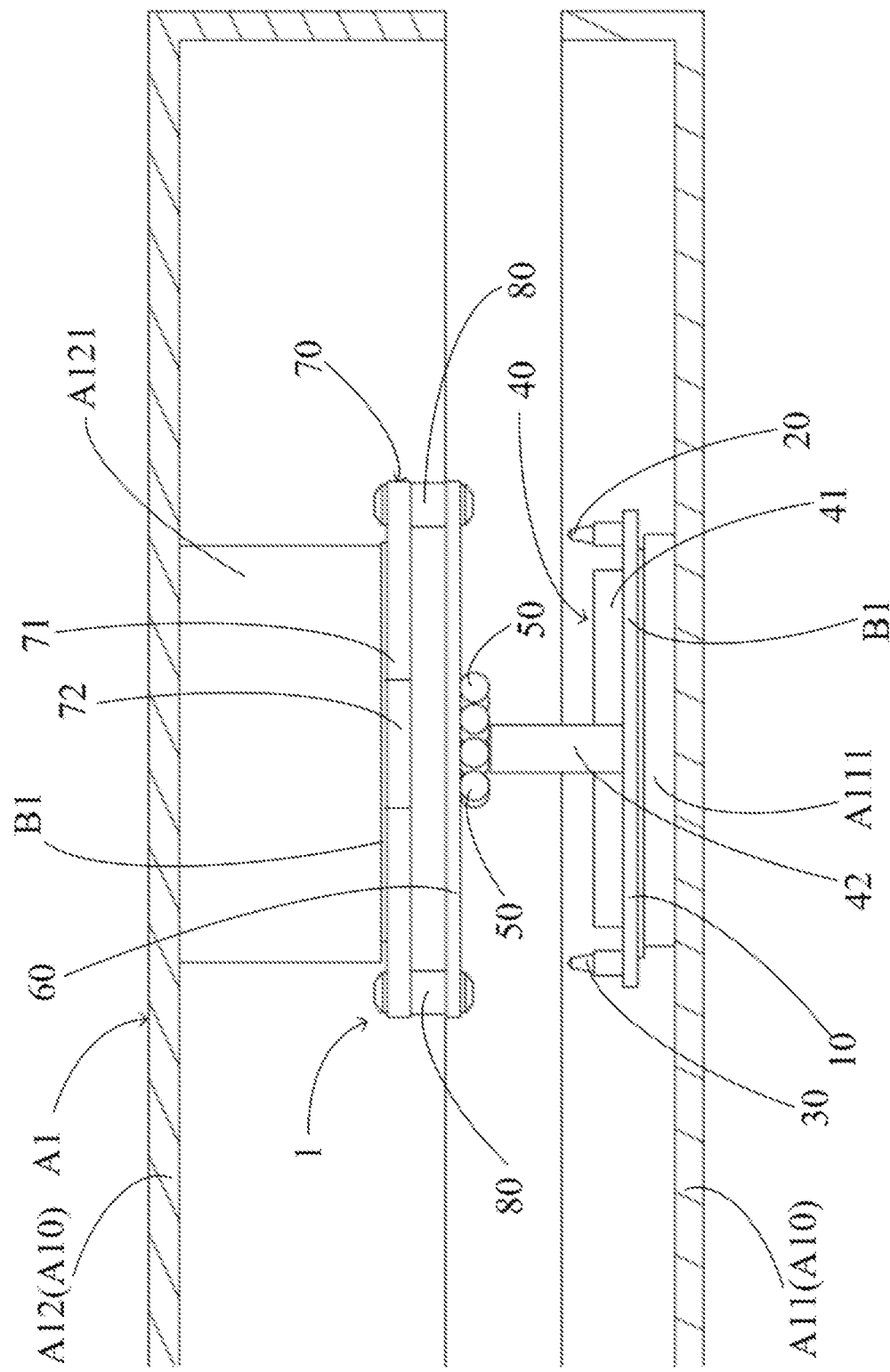
FIG. 5 is a schematic view of the electronic apparatus of FIG. 1, the upper casing being separated from the lower casing.

FIG. 5 is a schematic view of the electronic apparatus A1 of FIG. 1, the upper casing A12 is separated from the lower casing A11. As shown in FIG. 5, if the user opens the casing A10 of the electronic apparatus A1, the upper casing A12 and the lower casing A11 will be separated. Since the carrier 40 and the base plate 10 are affixed to the lower casing A11 and the waveguide element 60 and the magnetic element 70 are affixed to the upper casing A12, the bucket structure 42 is separated from the magnetic element 70, and the waveguide element 60 is pulled away from the carrier 40. At this time, the magnetic element 70 attracts the balls 50 to the central area of the waveguide element 60, and the balls 50 are thus separated from the receiving grooves 411. Therefore, since the user cannot know the predetermined arrangement of the balls 50, he will not be able to arrange the balls 50 in the receiving grooves 411 according to the predetermined arrangement.

If the user arranges the balls 50 in the receiving grooves 411 in an arrangement which is different from the predetermined arrangement, the repair engineer can decide that the casing A10 of the electronic apparatus A1 has been opened by the user. The engineer can drive the electronic apparatus A1 to transmit a vibration signal to the vibrator 20. The sensor 30 detects the vibration of the waveform of the waveguide element 60 to form a test signal. Since the test signal detected by the sensor 30 is different from the original setting signal, the engineer can determine that the casing A10 of the electronic apparatus A1 has been opened by the user.

In one embodiment, for information security, when the electronic apparatus A1 is activated, the detection device will be driven to obtain the test signal. When the test signal is different from the original setting signal, the electronic apparatus A1 can transmit a warning signal to the user, and can further stop or limit the function of the electronic apparatus A1.

According to the embodiments of the disclosure, the engineer can decide whether the casing of the electronic apparatus has been opened by the user by making use of the tamper-detection device 1, so as to determine responsibility for repair or replacement of the electronic apparatus. The user will not be able to hide or disguise the opening of the casing.

Many details are often found in the relevant art, thus many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A disassembling detection device configure to be disposed in a casing comprising a lower casing and an upper casing, wherein the disassembling detection device comprising:
    a base plate configured to being affixed in the lower casing;
    a vibrator disposed on the base plate;
    a sensor disposed on the base plate;
    a carrier disposed between the vibrator and the sensor, the carrier comprising a plurality of receiving grooves;
    a plurality of balls arranged in the receiving grooves by a predetermined arrangement, wherein a number of the plurality of balls is less than a number of the plurality of receiving grooves;
    a waveguide element in contact with the plurality of balls; and
    a magnetic element disposed on the waveguide element, and configured to be affixed to the upper casing;
    wherein when the upper casing is separated from the lower casing, the waveguide element is pulled away from the carrier, and the magnetic element attracts the plurality of balls to the waveguide element.

2. The disassembling detection device as claimed in claim 1, wherein the vibrator is configured to vibrate the waveguide element when a vibration signal is generated, the sensor detects a vibration of the waveguide element and generates a setting signal when the waveguide element is vibrated by the vibrator.

3. The disassembling detection device as claimed in claim 2, wherein the setting signal corresponds to an arrangement of the plurality of balls in the plurality of receiving grooves, wherein when the arrangement of the balls in the receiving grooves is different from the predetermined arrangement, the sensor detects the waveguide element and generates a test signal, the test signal is different from the setting signal.

4. The disassembling detection device as claimed in claim 1, wherein each of a top of the vibrator and a top of the sensor is in contact with the waveguide element.

5. The disassembling detection device as claimed in claim 1, wherein the base plate is a circuit board, and the vibrator and the sensor are electrically connected to the circuit board.

6. The disassembling detection device as claimed in claim 1, further comprising a connecting element connected to the magnetic element and the waveguide element, and the waveguide element is separated from the magnetic element.

7. The disassembling detection device as claimed in claim 6, wherein the connecting element is an elastic part, and configured to reduce vibrations of the waveguide element being transmitted to the magnetic element.

8. The disassembling detection device as claimed in claim 1, wherein the carrier comprises:
    a carrying body comprising the receiving grooves; and
    a buckle structure connected to the carrying body, and fastened to the magnetic element;
    wherein when the upper casing is separated from the lower casing, the buckle structure is separated from the magnetic element.

9. The disassembling detection device as claimed in claim 1, wherein the magnetic element is a plate structure, and adhered to the upper casing by glue, wherein the magnetic element is parallel to the waveguide element.

10. The disassembling detection device as claimed in claim 1, wherein the magnetic element comprises:
    a fixed plate having an opening; and
    a magnet disposed in the opening,
    wherein the opening is at a central area of the fixed plate, and the magnet corresponds to a central area of the carrier.

* * * * *